US009158906B2

(12) United States Patent
Guajardo Merchan et al.

(10) Patent No.: US 9,158,906 B2
(45) Date of Patent: Oct. 13, 2015

(54) AUTHENTICATING A DEVICE AND A USER (75) Inventors: Jorge Guajardo Merchan, Eindhoven (NL); Milan Petkovic, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 417 days.

(21) Appl. No.: 13/119,505

(22) PCT Filed: Sep. 21, 2009

(86) PCT No.: PCT/IB2009/054120
§ 371 (c)(1),
(2), (4) Date: Mar. 17, 2011

(87) PCT Pub. No.: WO2010/035202
PCT Pub. Date: Apr. 1, 2010

(65) Prior Publication Data
US 2011/0191837 A1    Aug. 4, 2011

(30) Foreign Application Priority Data
Sep. 26, 2008 (EP) .................................. 08165202

(51) Int. Cl.
*G06F 21/00* (2013.01)
*G06F 21/34* (2013.01)
(Continued)

(52) U.S. Cl.
CPC ............... *G06F 21/34* (2013.01); *G06F 21/32* (2013.01); *H04L 9/0866* (2013.01); *H04L 9/3278* (2013.01); *G06F 2221/2115* (2013.01); *G06F 2221/2129* (2013.01)

(58) Field of Classification Search
CPC ............ G06F 21/31; G06F 2221/2115; G06F 2221/2129; H04L 63/08; H04L 9/3278

USPC ................ 726/2, 5–7, 9, 20–21, 27–29; 713/184–186; 380/258
See application file for complete search history.

(56) References Cited

U.S. PATENT DOCUMENTS 7,996,683 B2 * 8/2011 Lyseggen et al. ............. 713/186
2002/0091329 A1 7/2002 Heikkila et al.
(Continued)

FOREIGN PATENT DOCUMENTS

EP           1304633 A    4/2003
JP      2003198528 A    7/2003
(Continued)

OTHER PUBLICATIONS

Goldreich et al, "Chinese Remaindering With Errors", Proceedings of The 31st Annual ACM Symposium on Theory of Computing, vol. 46, No. 4, 2000, pp. 1-16.
(Continued)

*Primary Examiner* — Brandon Hoffman
*Assistant Examiner* — Thong Truong (57) ABSTRACT

A method of authenticating a device and a user comprises receiving a user input, generating a first key from the user input, performing a physical measurement of the device, obtaining helper data for the device, computing a second key from the physical measurement and the helper data, and performing an operation using the first and second keys. In a preferred embodiment, the method comprises performing a defined function on the first and second keys to obtain a third key. Additionally security can be provided by the step of receiving a user input comprising performing a biometric measurement of the user and the step of generating a first key from the user input comprises obtaining helper data for the user and computing the first key from the biometric measurement and the user helper data.

18 Claims, 7 Drawing Sheets

(51) Int. Cl.
*G06F 21/32* (2013.01)
*H04L 9/08* (2006.01)
*H04L 9/32* (2006.01)

(56) References Cited

U.S. PATENT DOCUMENTS

| | | | |
|---|---|---|---|
| 2003/0103628 | A1 | 6/2003 | Luc et al. |
| 2005/0268094 | A1* | 12/2005 | Kohan et al. ............. 713/165 |
| 2007/0044139 | A1* | 2/2007 | Tuyls et al. ............. 726/2 |
| 2007/0050303 | A1* | 3/2007 | Schroeder et al. ............. 705/67 |
| 2007/0067642 | A1 | 3/2007 | Singhal |
| 2007/0226513 | A1 | 9/2007 | Handa et al. |
| 2008/0260152 | A1* | 10/2008 | Skoric et al. ............. 380/258 |
| 2009/0183248 | A1* | 7/2009 | Tuyls et al. ............. 726/9 |
| 2009/0282259 | A1* | 11/2009 | Skoric et al. ............. 713/185 |
| 2010/0119061 | A1* | 5/2010 | Kawale ............. 380/44 |
| 2011/0002461 | A1* | 1/2011 | Erhart et al. ............. 380/44 |

FOREIGN PATENT DOCUMENTS

| | | |
|---|---|---|
| JP | 2005123883 A | 5/2005 |
| JP | 2005322963 A | 11/2005 |
| JP | 2007500910 A | 1/2007 |
| WO | 2006067739 A2 | 6/2006 |
| WO | 2007063475 A2 | 6/2007 |
| WO | 2007069190 A2 | 6/2007 |
| WO | 2007070767 A | 6/2007 |
| WO | 2007116325 A2 | 10/2007 |
| WO | 2007125478 A1 | 11/2007 |
| WO | 2008014432 A1 | 1/2008 |
| WO | 2008038220 A1 | 4/2008 |

OTHER PUBLICATIONS

Carter et al, "Universal Classes of Hash Functions", Journal of Computer and System Sciences, vol. 18, 1979, pp. 143-154.
Gassend et al, "Silicon Physical Random Functions", Proceedings of the Computer and Communication Security Conference, Nov. 2002, pp. 1-14.
Kevenaar et al, Robust and Secure Biometrics: Some Appilcation Examples, Philps Research Europe, 2006, pp. 1-8.
Dodis et al, "Fuzzy Extractors: How to Generate Strong Keys From Biometrics and Other Noisy Data", Eurocrypt, vol. 3027, 2004, pp. 1-45.
Kevenaar, "Face Recognition With Renewable and Privacy Preserving Binary Templates", Proceedings of the Fourth IEEE Workshop on Automatic Identification Advanced Technologies, 2005, pp. 21-26.
Tunstall, "Secure Cryptographic Algorithm Implementation on Embedded Platforms", Thesis Submitted to the University of London, 2006, 241 Pages Document.
Linnartz et al, "New Shielding Functions to Enhance Privacy and Prevent Misuse of Biometric Templates", Audio-and Video Based Biometric Person Authentication, Lecture Notes in Computer Science, vol. 2688, 2003, pp. 1-9.
Pappu, "Physical One-Way Functions", Ph.D. Thesis, MIT, 2001, pp. 1-154.
Recommendations for Proper User Identification in Continua Version 1—PAN and XHR Interfaces, Draft V.01, Dec. 2007, pp. 1-15.
Kaji et al, "Declare-Next Authentication Method—Sescure Use of Insecure Magnetic Cards", Institue of Electronics, Information and Communication Engineers, 1996, pp. 21-28.
Menezes, "Handbook of Applied Cryptography", Jun. 1996, pp. 1-794.
Medkey, Downloaded From http://www.medkey.com, Apr. 27, 2015, 3 Pages.

* cited by examiner

AUTHENTICATING A DEVICE AND A USER

FIELD OF THE INVENTION

This invention relates to a method of, and a system for, authenticating a device and a user. In one embodiment, the invention provides a combined device and patient authentication system for health services, especially those delivered as a part of a system in which the patient and healthcare provider are remote from one another and connected by an electronic system.

BACKGROUND OF THE INVENTION

An increasingly important trend in healthcare is one of consumer/patient involvement at all levels of healthcare. People are taking a more active role in their own health management. This trend of patient empowerment has already been widely supported. A number of solutions, (see for example, Capmed, http://www.phrforme.com/index.asp, Medkey, http://www.medkey.com/ and Webmd, http://www.webmd.com) have been introduced into the market that allow patients to collect their own health-related information and to store them on portable devices, computers, and in online services. These solutions are often referred to as Personal Health Record (PHR) services. Already a number of products in the market allow patients to enter automatically measurements and other medical data into their PHRs, see for example, Lifesensor, https://www.lifesensor.com/en/us/, and healthvault, http://search.healthvault.com/. For example a weight-scale sends its information via Bluetooth to a computer, from which the data is uploaded to a PHR. This allows patients to collect and manage their health data, but even more importantly to share the data with various healthcare professionals involved in their treatment.

Another important trend in healthcare is that the delivery of healthcare has gradually extended from acute institutional care to outpatient care and home care. Advances in information and communication technologies have enabled remote healthcare services (telehealth) including telemedicine and remote patient monitoring. A number of services in the market already deploy telehealth infrastructures where the measurement devices are connected via home hubs to remote backend servers. Health care providers use this architecture to remotely access the measurement data and help the patients. Examples are disease management services (such as Philips Motiva and PTS) or emergency response services (Philips Lifeline).

Figure 1:
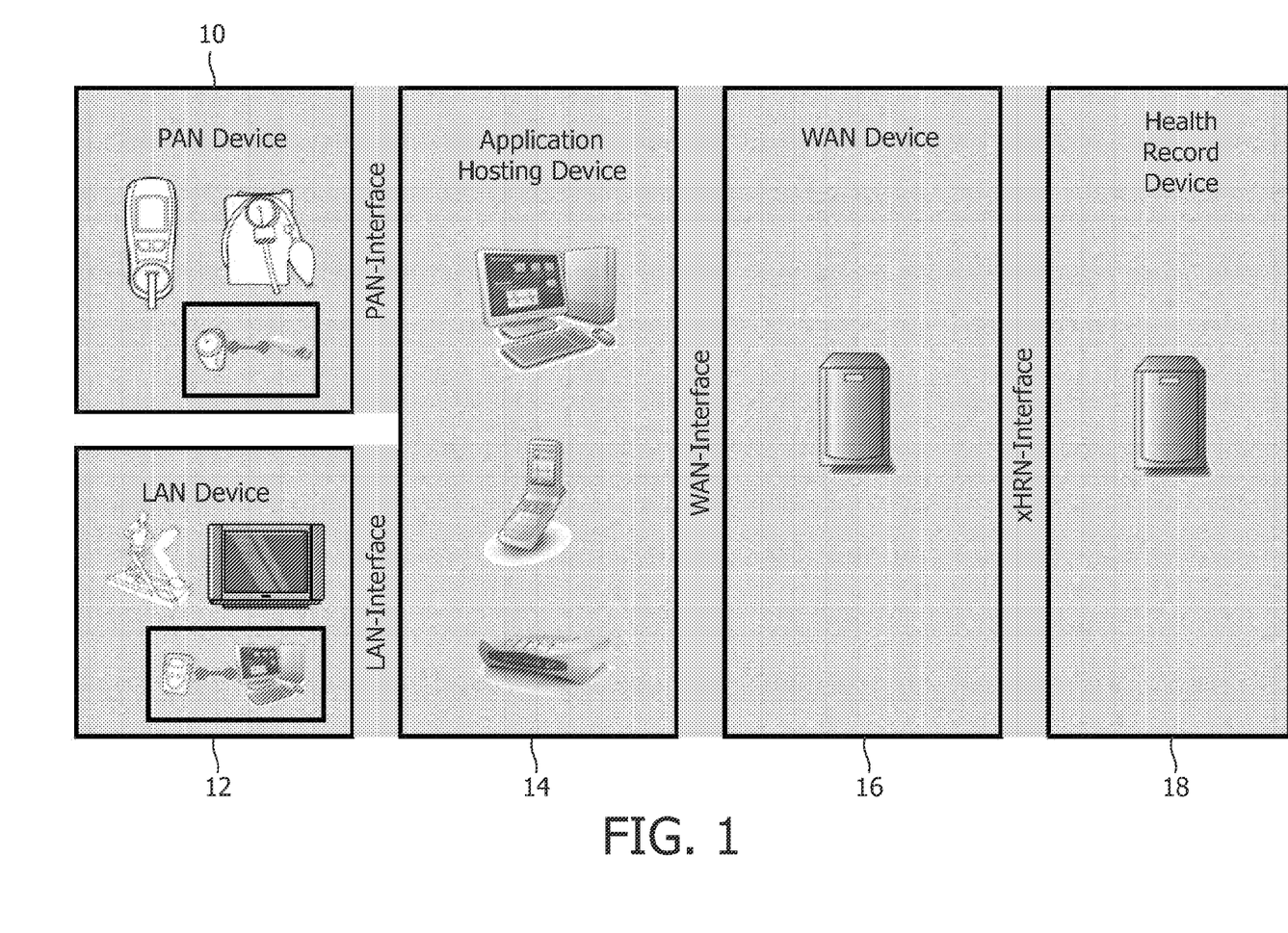
FIG. 1 is a schematic diagram of a healthcare system.

Interoperability of measurement devices, home hubs and backend services becomes very important for enabling and further growth of this market. This need is recognized by the Continua health alliance, see http://www.continuaalliance.org, for example. As shown in FIG. 1, this initiative aim to standardize protocols between measurement devices, home hub (application hosting) devices, online healthcare/wellness services (WAN) and health record devices (PHRs/EHRs). In addition to data format and exchange issues, the Continua alliance is also addressing security and safety issues.

One of the basic security and safety problems in the domain of telehealth is the problem of user and device authentication/identification. Namely, when data remotely measured by patients is used by telehealth services or in the medical professional world, the healthcare providers need to place greater trust in information that patients report. In particular, they have to be ensured that a measurement is coming from the right patient and that appropriate device was used to take the measurement. Consider a blood pressure measurement; it is crucial to know that the blood pressure of a registered user is measured (not of his friends/children), and that the measurement was taken by a certified device and not a cheap fake device. This is very important, because otherwise there can result critical health care decisions based on wrong data.

In current practice, a device identifier (device ID) is either used as a user identifier (user ID) or as a means to derive a user ID (if multiple users are using the same device). For example, in the Continua system, as described in "Continua Health Alliance, Recommendations for Proper User Identification in Continua Version 1—PAN and xHR interfaces (Draft v.01)", December 2007, at the PAN interface, as shown in FIG. 1, each Continua device is required to send its own unique device ID. The user ID is optional (and can be just simple as 1, 2, A, B). The valid user ID is obtained at the hub device (application hosting device), which can provide mapping between a simple user ID associated with a device ID to a valid user ID. There might be also measurement devices that can send a valid user ID next to the device ID. Then the mapping is not needed.

There are several problems with the current approach. For example, the current approach does not support authentication of users/devices, it only appends the user ID to the measurement. Data provenance is not established, as a healthcare provider later in the process cannot securely find which device was used to create the measurement. Next to that, the current mapping approach does not quickly lock the user and device ID together, but it introduces room for mistakes. Either a user makes an unintended mistake (if manual mapping is required—the user has to select his ID (1 or A) at application hosting device or measurement device for each measurement) or the system can mix the users (the application designer should take special care to provide data management in a way to reduce the potential for associating measurements to the wrong user). In this type of arrangement, it is possible for a malicious user to introduce wrong measurements by impersonating the real user. Similarly, the device ID can be copied to forged devices, which can be easily introduced in the eco system. Then a user can use these devices to produce data that will look reliable but in fact will be unreliable.

It is therefore an object of the invention to improve upon the known art.

According to a first aspect of the present invention, there is provided a method of authenticating a device and a user comprising receiving a user input, generating a first key from the user input, performing a physical measurement of the device, obtaining helper data for the device, computing a second key from the physical measurement and the helper data, and performing an operation using the first and second keys.

According to a second aspect of the present invention, there is provided a system for authenticating a device and a user comprising a user interface arranged to receive a user input, a query component arranged to perform a physical measurement of the device, and a processing component connected to the user interface and the query component, and arranged to generate a first key from the user input, to obtain helper data for the device, to compute a second key from the physical measurement and the helper data, and to perform an operation using the first and second keys.

According to a third aspect of the present invention, there is provided a method of registering a device and a user comprising receiving a user input, generating a first key from the user input, performing a physical measurement of the device, generating a second key and helper data for the device from the physical measurement, performing an operation using the first and second keys, and transmitting an output of the operation to a remote data store.

According to a fourth aspect of the present invention, there is provided a system for registering a device and a user comprising a user interface arranged to receive a user input, a query component arranged to perform a physical measurement of the device, and a processing component arranged to generate a first key from the user input, to generate a second key and helper data for the device from the physical measurement, to perform an operation using the first and second keys, and to transmit an output of the operation to a remote data store.

Owing to the invention, it is possible to bind the identity of a user and a device so as to certify that data originating from the device originates from the particular device and the particular user. This supports data quality assurance and reliability in personal healthcare applications. In this system, there is delivered a method to bind the identity of a user and a device identifier as early as possible, so as to certify that data originating from the device originates from the particular device and the particular user. To ensure proper device and user authentication/identification it is possible to use a Physically Uncloneable Function (PUF, described in detail below) in combination with a user input.

As a result there is covered the three problems from the prior art by providing respectively, close coupling of the user ID and the identification of the device used to take the measurement (the use of unregistered device/user is immediately detected), strong user authentication and anti-counterfeiting and strong device authentication. This has the following benefits, patient safety (diagnosis and health decisions are based on reliable data), reduction of costs (reuse of patient provided data in the consumer health and the professional healthcare domain) and convenience for the patient (they can take healthcare measurements at home).

In a preferred embodiment, the step of receiving a user input comprises performing a biometric measurement of the user and the step of generating a first key from the user input comprises obtaining helper data for the user and computing the first key from the biometric measurement and the user helper data. The user of a biometric measurement, such as a fingerprint, increases the security of the system and ensures that any data taken from an individual is authenticated as being from that specific individual, when the data is analyzed by a remote health system.

Advantageously, the method comprises performing a defined function on the first and second keys to obtain a third key. The security of the system can be increased if the two keys, one from the device and one from the user are combined together to create a third key, prior to any transmittal to a remote location. The combination can be performed according to a function of both inputs. Such function can be for example: (i) the concatenation of both strings, the XORing of both strings, the concatenation of both strings and subsequent hashing of the resulting string, the XORing of both strings and then hashing the resulting string, the encryption of one string according to an encryption algorithm (e.g. the Advanced Encryption Standard) using as key one of the strings and as plaintext the second string, etc.

In a further embodiment, the step of receiving a user input comprises receiving a password and the step of generating a first key from the user input comprises computing the first key from the password. Rather than using biometric data, a simple password can be used to authenticate the user. Although this does not have the highest level of security associated with using the biometric data, this still provides a system that is an improvement over current known systems.

Ideally, the step of obtaining helper data for the device comprises computing the helper data from the first key and a stored component. The key for the device (the second key) is created from the physical measurement performed on the device and the helper data. If the helper data is reconstructed from the first key (from the user) and some stored component, then the security of the system of authenticating the device and user is increased, because the helper data is never stored in the clear.

Advantageously, the method further comprises obtaining a user share, obtaining a device share, and performing a defined function on the user share, device share, first and second keys to obtain a third key. The use of a user share and device share allows more than one device to be authenticated to a specific user, which increases the efficiency of the registration and authentication system.

BRIEF DESCRIPTION OF THE DRAWINGS

Embodiments of the present invention will now be described, by way of example only, with reference to the accompanying drawings, in which:—

DETAILED DESCRIPTION OF THE EMBODIMENTS

An example of a healthcare system is shown in FIG. 1. Various PAN (personal area network) devices 10 are shown such as a wristwatch and a blood pressure measuring device, which directly measure physiological parameters of a user. Additionally LAN (local area network) devices 12 are provided such as a treadmill which can also be used to gather healthcare information about the user. The PAN devices 10 and the LAN devices 12 are connected via suitable interfaces (wired and/or wireless) to an appropriate application hosting device 14, such a computer or mobile phone, which will be local to the PAN and LAN devices 10 and 12. This hosting device 14 will be running a suitable application which can gather and organize the outputs from the various PAN and LAN devices 10 and 12.

The application hosting device 14 is connected to a WAN (wide area network) device 16 such as a server. The WAN connection can be via a network such as the Internet. The server 16 is also connected via a suitable interface to a health record device 18, which is maintaining a health record for the users of the system. As discussed above, it is of paramount importance that the data recorded by the individual health records stored by the device 18 is assigned, firstly to the correct user, and additionally, that the device which recorded the data is known with absolute certainty. It is also advisable that the relevant PAN or LAN device 10 or 12 is also approved for use in the system.

Figure 2:
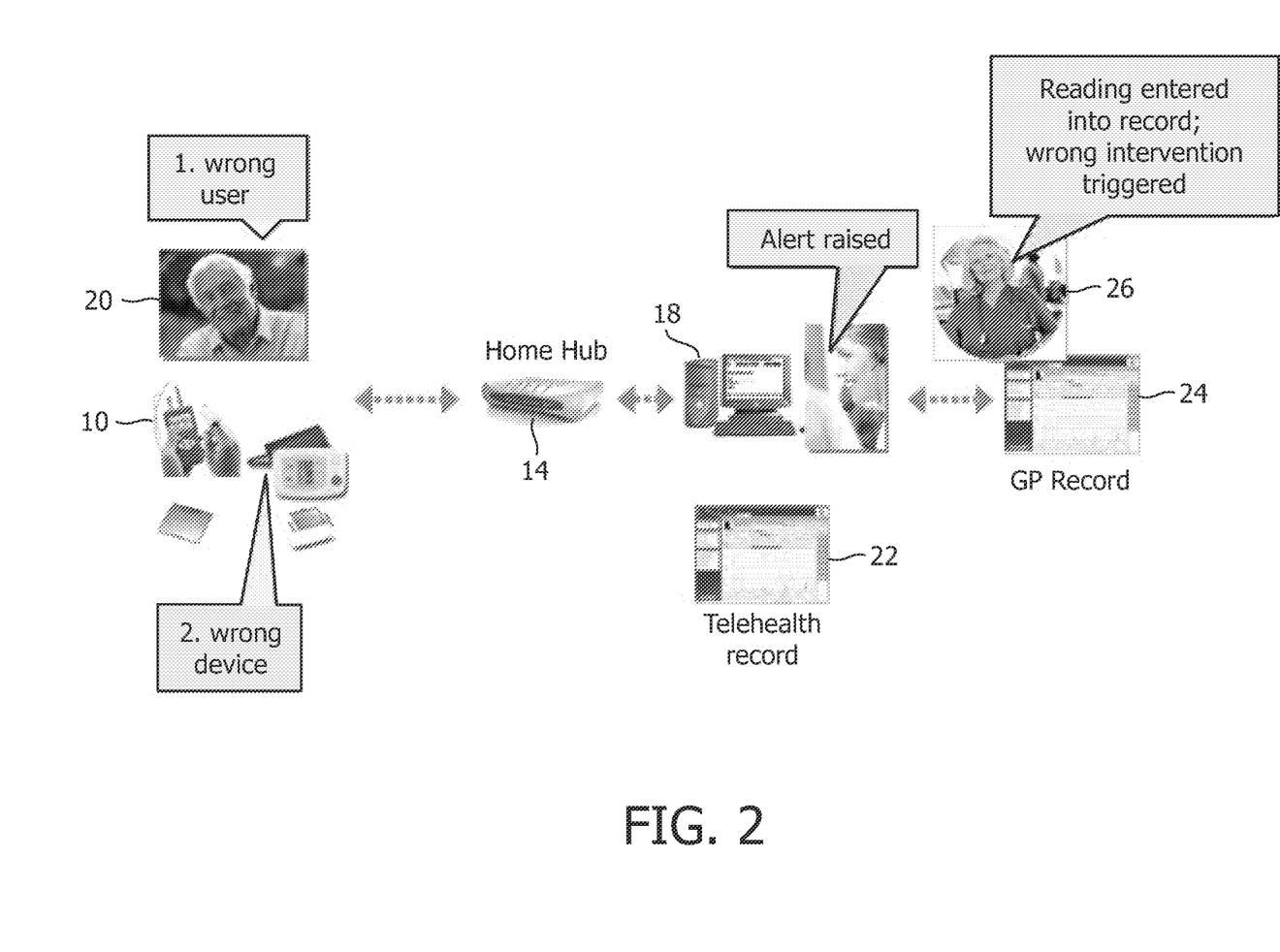
FIG. 2 is a further schematic diagram of the healthcare system.

FIG. 2 illustrates the system of FIG. 1, with a user 20 who is taking a measurement with a PAN device 10. Through the home hub 14, data can be communicated to the remote record device 18, which is maintaining the patient's record 22. The remote record device 18 also communicates directly with a GP record 24. In this example, the user 20 has wrongly identified themselves to the device 10, and is also using an incorrect device 10, for the measurement that they are trying to make. In a conventional system, this will result in an incorrect entry being made in their record 22, and could cause an incorrect alert to be raised with respect to the patient's condition.

Figure 3:
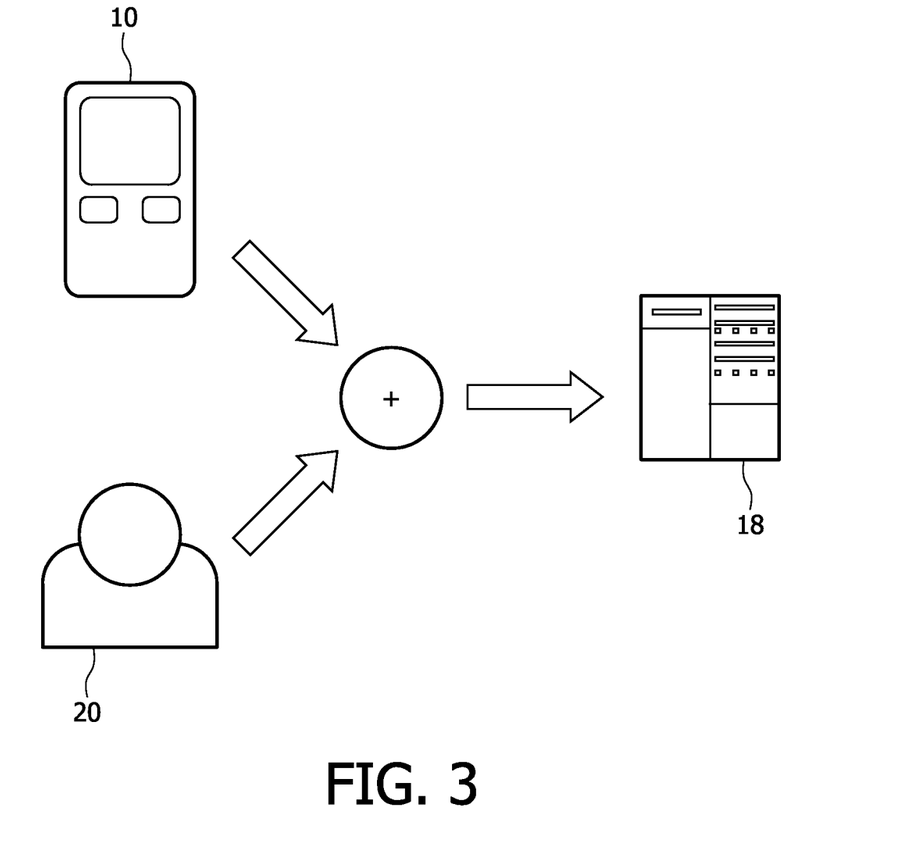
FIG. 3 is a schematic diagram of a device and user authentication system.

In order to prevent the kind of error that is illustrated by FIG. 2, the system according to the present invention is summarized in FIG. 3. This Figure. shows a device 10 and the user 20, communicating with the remote healthcare device 18. The essential principle is that a key is derived from the user 20 and a key is derived from the device 10, and, in one embodiment, these are combined together and transmitted to the remote server 18 as a third key. The user 20 could supply a password, or in the preferred embodiment, there is performed a biometric measurement of the user 20 (such as a fingerprint) and the user key is generated from this biometric measurement. The key from the device 10 is derived from a physical measurement of the device. One method of achieving this is to use a function known as a PUF, described below.

The system of FIG. 3 for authenticating the device 10 and the user 20 comprises a user interface arranged to receive a user input, a query component arranged to perform a physical measurement of the device, and a processing component connected to the user interface and the query component, and arranged to generate a first key from the user input, to obtain helper data for the device, to compute a second key from the physical measurement and the helper data, and to perform an operation using the first and second keys. These three components, the user interface, the query component and the processing component could all be contained within the device 10, or could be distributed amongst different devices. Indeed the functions of the processing component could be split between different processors contained in different devices.

A Physical Uncloneable Function (PUF) is a function that is realized by a physical system, such that the function is easy to evaluate but the physical system is hard to characterize and hard to clone, see for example R. Pappu, "Physical One-Way Functions", Ph.D. thesis, MIT, 2001. Since a PUF cannot be copied or modeled, a device equipped with a PUF becomes uncloneable. Physical systems that are produced by an uncontrolled production process (i.e. that contains some randomness) are good candidates for PUFs. The PUF's physical system is designed such that it interacts in a complicated way with stimuli (challenges) and leads to unique but unpredictable responses. A PUF challenge and the corresponding response are together called a Challenge-Response-Pair. It is possible for a PUF to have a single challenge, or a limited (small) number of challenges (less than 32 for example), or a large number of challenges ($2^n$ challenges for n>5).

One example of a PUF is the so-called SRAM PUFs. As far as experiments have shown today, these PUFs are present on any device having an SRAM on board. It is based on the phenomenon that when an SRAM cell is started up, it starts up in a random state. However, when this is done multiple times, the SRAM starts up, most of the time, in the same state and can therefore be used as a type of PUF. S-RAM PUFs are described in more detail in ID685102. Other PUFs include an optical PUF, disclosed in the above reference and a delay PUF (see Gassend et al., Su et al.—IC PUFs (Delay PUF) CCS 2002, ACSAC 2002).

As previously mentioned, PUF responses are noisy and not fully random. Thus, a Fuzzy Extractor or Helper Data Algorithm (see J.-P. M. G. Linnartz and P. Tuyls, "New Shielding Functions to Enhance Privacy and Prevent Misuse of Biometric Templates," in Audio- and Video-Based Biometrie Person Authentication—AVBPA 2003, ser. LNCS, J. Kittler and M. S. Nixon, Eds., vol. 2688. Springer, Jun. 9-11, 2003, pp. 393-402 and Y. Dodis, M. Reyzin, and A. Smith, "Fuzzy extractors: How to generate strong keys from biometrics and other noisy data," in Advances in Cryptology—EUROCRYPT 2004, ser. LNCS, C. Cachin and J. Camenisch, Eds., vol. 3027. Springer-Verlag, 2004, pp. 523-540.) is required to extract one (or more) secure keys from the PUF responses.

In the following, there is provided the intuition behind the algorithms. A fuzzy extractor requires two basic primitives, firstly information reconciliation or error correction and secondly privacy amplification or randomness extraction, which guarantees an output which is very close to being a uniformly distributed random variable. In order to implement those two primitives, helper data W is generated during the enrolment or registration phase. Later, during the key reconstruction or authentication phase, the key is reconstructed based on a noisy measurement Ri and the helper data W. During the enrolment phase (carried out in a trusted environment), a probabilistic procedure called Gen is run. This procedure takes as its input a PUF response R, and produces as output a key K and helper data W: $(K,W) \leftarrow Gen(R)$. In order to generate the helper data W, an error correcting code C is chosen such that at least t errors can be corrected. The number of errors to be corrected depends on the particular application and on the PUF properties.

Once an appropriate code has been chosen, the helper data W is generated by first choosing a random code word $C_S$ from C and computing $W1 = C_S \oplus R$. Furthermore a universal hash function (see L. Carter and M. N. Wegman, "Universal Classes of Hash Functions," J. Comput. Syst. Sci., vol. 18, no. 2, pp. 143-154, 1979) $h_i$ is chosen at random from a set H and the key K is defined as $K \leftarrow h_i(R)$. The helper data is then defined as W=(W1, i). During the key reconstruction phase a procedure called Rep is run. It takes as input a noisy response R' and helper data W and reconstructs the key K (if R' originates from the same source as R) i.e. $K \leftarrow Rep(R',W)$. Reconstruction of the key is achieved by computing $C_S' = W1 \oplus R'$, decoding $C_S'$ to $C_S$ via the decoding algorithm of C, recovering $R = C_S \oplus W1$, and finally computing $K = h_i(R)$. The present method will work also with other types of helper data. For example, instead of XORing, it is possible to also perform a permutation.

It should be noted that the symbol $\oplus$ is used to indicate an XOR operation. The logical operation exclusive disjunction, also called exclusive or (XOR), is a type of logical disjunction on two operands that results in a value of "true", if and only if, exactly one of the operands has a value of "true".

Fuzzy extractor construction can also be used to generate unique identifiers or keys from biometric data. Instead of having a PUF response, there is used a person's biometric data. This can be further enhanced by computing the hash (say SHA-2) of K (where $K = h_i(R)$, and R is a biometric measurement). See T. Kevenaar, G. J. Schrijen, A. Akkermans, M. Damstra, P. Tuyls, M. van der Veen, Robust and Secure Biometrics: Some Application Examples. ISSE 2006 for an overview of different applications of this construction and Kevenaar, T. A. M, Schrijen, G. J., van der Veen, M., Akkermans, A. H. M. and Zuo, F.: Face Recognition with Renewable and Privacy Preserving Templates. Proc. 4th IEEE Workshop on Automatic Identification Advanced Technologies (AutoID 2005), 17-18 Oct. 2005 Page(s): 21-26 for an example applied to biometrics based on face recognition.

As previously mentioned, the system of the present invention is designed to link a measurement to both a device ID and the particular user. A stable device ID can be derived from a PUF response and associated helper data. The helper data can be chosen randomly from code words of an error correcting code. In a preferred embodiment, the helper data is derived from both an error correcting code and from a string derived from a biometric measurement of the user. By constructing such helper data, it is possible to authenticate both the device and the user at once.

In a preferred embodiment, it is assumed that the following are available on the device that is being used, a PUF such that when challenge with $C_i$ produces a response $R_i$, which is written as $R_i \leftarrow PUF(C_i)$, a GenPUF algorithm which upon getting a PUF response $R_i$ outputs $(K_i, W_i)$, with $(K_i, W_i) \leftarrow GenPUF(R_i)$, a RepPUF algorithm which upon getting a PUF response $R_i'$ and helper data $W_i$ outputs the key $K_i$ if $R_i$ and $R_i'$ are sufficiently close, with $K_i \leftarrow RepPUF(R_i', W_i)$, a GenBio algorithm which upon getting a biometric measurement $BM_u$ from user U outputs $(K_u, W_u)$, with $(K_u, W_u) \leftarrow GenBio(BM_u)$, and a RepBio algorithm which upon getting a biometric measurement $BM_u$ from user U and helper data $W_u$ outputs the key $K_u$ if $BM_u$ and $BM_u'$ are sufficiently close, $K_u \leftarrow RepBio(BM_u', W_u)$. It is assumed that the device that is used to perform the measurements has a PUF embedded in it. This can be easily expected from any device containing, for example an SRAM memory, such as any microprocessor or microcontroller. Clearly, the algorithms GenPUF, GenBio, RepPUF, and RepBio can be implemented on the device but do not have to. They could be implemented on a second device. The first option is better from the security stand point. However, the second option makes it possible to implement the system for devices with limited processing capabilities.

Figure 4:
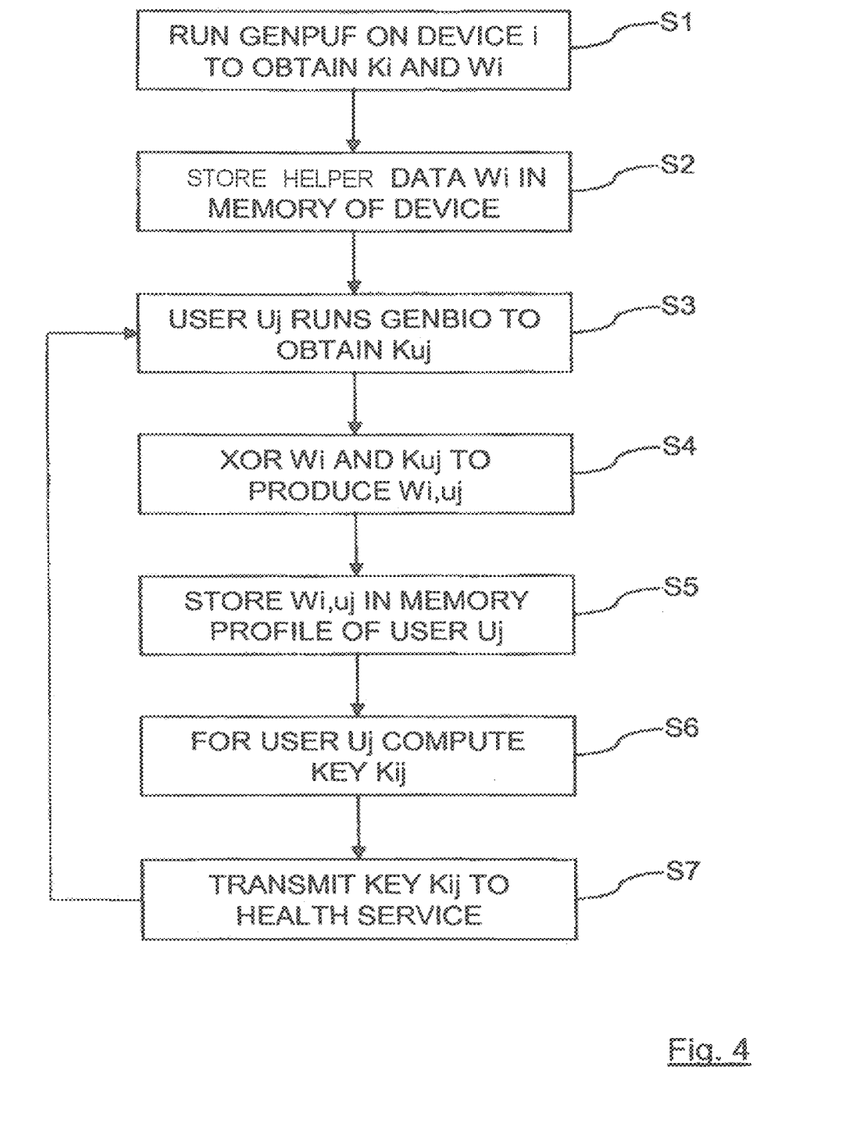
FIG. 4 is a flowchart of a registration procedure.

FIG. 4 shows how the system would work in relation to a preferred embodiment of the registration procedure. Firstly, a group of users has a device i which measures some signal of users U1, U2, U3, . . . , Un. Prior to using the device for the first time, one of the users (Uj) runs the procedure GenPUF on the PUF of device i and obtains $(K_i, W_i) \leftarrow GenPUF(R_i)$ corresponding to a response $R_i$ originating from device i. This is the step S1 of the process. Note that this step does not need to be run by device i. In particular, this procedure can be run by a separate entity. The only thing needed by the entity to run GenPUF is the response $R_i$.

At the second step S2, the helper data $W_i$ is stored in non-volatile memory of device i. An individual user, user Uj runs GenBio on his/her biometric (such as a fingerprint) and obtains $K_{uj}$, which is step S3. At step S4, this value is XORED with $W_i$ to produce $W_{i,uj}$, which is stored in the device in user's Uj memory profile space, at step S5. In other words, $W_{i,uj}=W_i$ XOR $K_{uj}$. A database is stored in the device with entries as follows: $(K_{uj}; W_{i,uj})$. The next step is step s6, in which for the user Uj there is computed a key $K_{ij}$ as a function of $K_i$ and $K_{uj}$, written $K_{ij} \leftarrow f(K_i, K_{uj})$. At step S7, this key is transmitted in a secure manner to the health service provider. Steps 3 to 7 are repeated for every user who wants to use the device. An alternative to storing the pairs $(K_{uj}; W_{i,uj})$ in the device's database is to store a pair $(U_j, W_{i,uj})$. This assumes that the user has a string $U_j$ that identifies him. This is more secure since the key $K_{uj}$ is not stored in the device but reconstructed every time that is needed. The string $U_j$ can be any identifying information such as the name of the user, his social security number, driver's license number, email address, etc.

In summary, the method of registering a device and a user comprising receiving the user input (which could be a biometric measurement or a password), generating the first key from the user input, performing a physical measurement (such as a PUF) of the device, generating a second key and helper data for the device from the physical measurement, performing an operation using the first and second keys, and transmitting an output of the operation to a remote data store.

Figure 5:
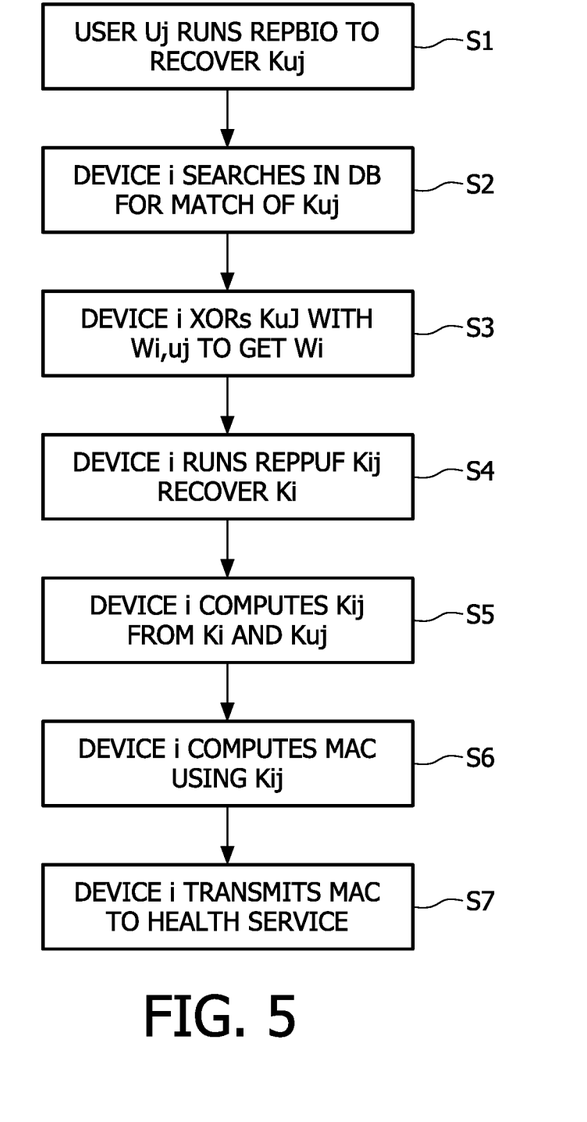
FIG. 5 is a flowchart of an authentication procedure.

A preferred embodiment of an authentication procedure is shown in FIG. 5. The procedure is used after the user and device have registered, as per the flowchart of FIG. 4. User Uj desires to use device i to perform a measurement. Before being able to operate the device, the first step S1, is that the user Uj runs $K_{uj} \leftarrow RepBio(BM_{uj}', W_{uj})$ and recovers $K_{uj}$. At step S2, the device i searches in its database for a match with $K_{uj}$. If it finds such a match it continues to step 3, otherwise the device stops and tells the user to register first, in order to be able to use device i.

If there is a match, then at step S3, the device i XORs $K_{uj}$ with $W_{i,uj}$ to obtain $W_i=W_{i,uj}$ XOR $K_{uj}$, followed by step S4, in which the device i runs $K_i \leftarrow RepPUF(R_i', W_i)$ to recover $K_i$. At step S5, the device i computes a function of $K_i$ and $K_{uj}$, written $f(K_i, K_{uj})$ resulting in a string $K_{ij}$ and, at step S6 the device i computes a Message Authentication Code (MAC) on the data measured with secret key $K_{ij}$. Finally, at step S7, the device i sends the data and the MAC to the health service provider. The health service provider verifies the MAC and if the verification succeeds the data is accepted.

In this way a secure method of authenticating a device and a user is delivered. Neither the physical function of the device (in the preferred embodiment the PUF) nor the data from the user (in the preferred embodiment the biometric data) can be cloned or faked in any way, and the transmittal of these keys (or a single key derived from them both) to the health service provider allows both the device and user to be authenticated. An alternative solution (Embodiment 2) to that provided by the procedures of flowcharts 4 and 5 is to perform separate authentication of the device and the patient and then combine these identifiers/keys or send them separately to the service provider. For example, it is possible to derive $K_i$ from PUF, then derive $K_{uj}$ from the user's biometrics and then combine the keys into a single key: $K_{ij}=Hash(K_i \| K_{uj})$. Based on this key ($K_{ij}$) a MAC or a signature on the data can be computed before being sent to the service provider. However, this would fail to identify, in the beginning, a user that has not run the registration procedure before using the measuring device for the first time (i.e. the user has to register a new key, for each new device he obtains; and this registration has to be done with all service providers and/or health service infrastructures that use his data).

Other variations of the preferred embodiment are also possible. For example, the device does not perform the key reconstruction itself, but rather sends the measured signal together with a PUF response $R_i'$ to a more powerful device, for example the home hub 14 in FIG. 2, where all the processing is performed. Note that in this particular case, there is no concern over the secrecy of the response. Rather the system is only interested in making sure that there is the correct data associated with the correct user and device.

The methodology above could also be adapted so that instead of computing a helper data $W_{i,uj}$, the device could simply store $W_i$ and then compute $K_{ij}$ as the XOR of $K_i$ and $K_{uj}$. However, this would fail to identify in the beginning a user that has not run the registration procedure before using the measuring device for the first time.

Another alternative could be that instead of using a symmetric-key based system the system can use an asymmetric key based system. Instead of considering Kij as a symmetric key, the system can use the secret-key of a public-key based system. Then in step S7 of the registration procedure (FIG. 4), instead of sending Kij to the service provider, the device can send the public-key associated with a secret-key Kij. This can be easily computed for typical public-key based systems.

In one embodiment there is performed a defined function on the first key from the user and the second key from the device to obtain a third key (Kij). The function used to compute Kij from Ki and Kuj could be, for example, a hash (SHA-1, SHA-2, MD5, RipeMD, etc.) of the concatenation of Ki and Kuj, an XOR of Ki and Kuj, an encryption of a constant string using as key Ki and Kuj, and encryption of Ki using Kuj as the encryption key of an encryption system, an encryption of Kuj using Ki as the encryption key of an encryption system, a value derived from a 2-out-n threshold scheme where two of the shares correspond to Ki and Kuj (see below for additional advantages of using threshold schemes), or any other function of Ki and Kuj appropriate for the application.

Figure 6A:
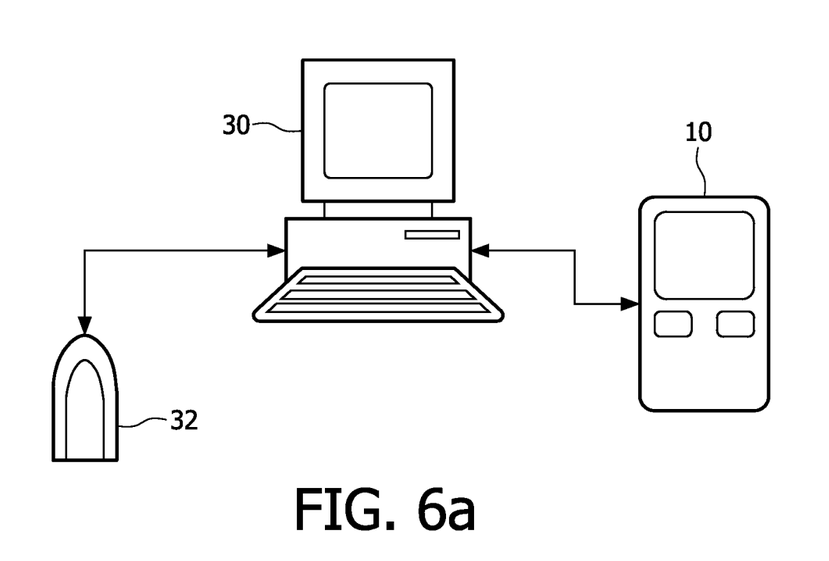
FIG. 6a is a schematic diagram of a preferred embodiment of the authentication system.
Figure 6B:
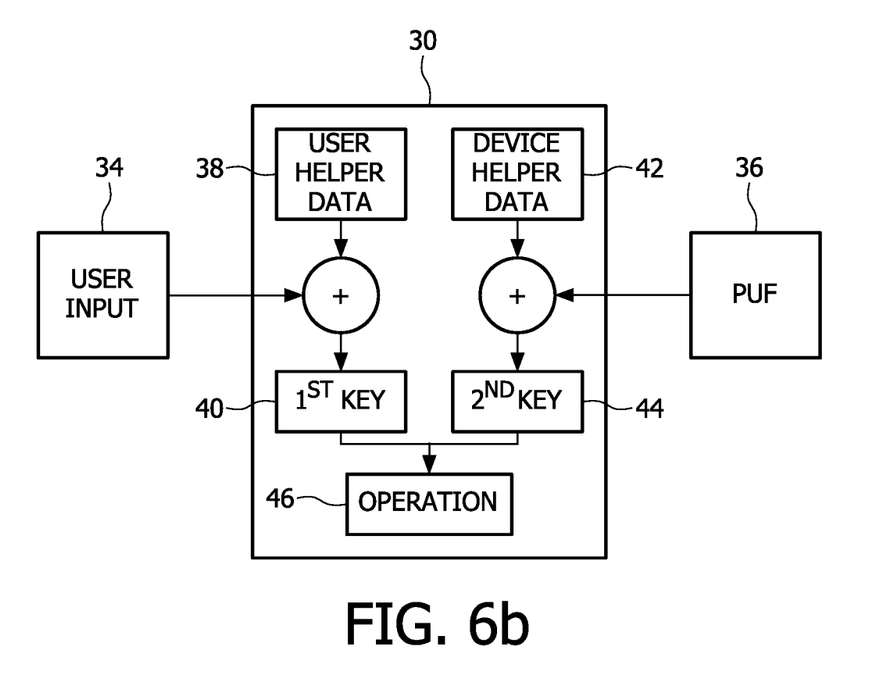
FIG. 6b is a further schematic diagram of a preferred embodiment of the authentication system.

The preferred embodiment of the invention is shown in FIG. 6a and FIG. 6b. In FIG. 6a a processor 30 is connected to a device 10 and a user input device 32. The device 10 is a device for measuring the blood pressure of the user, and the user input device 32 is a device for measuring the fingerprint of the user, when the user places their finger into the device. The system of this Figure assumes that the registration process has already taken place and the user has performed the measurement of their blood pressure with the device 10. The user wishes to authenticate the acquired data prior to sending that acquired data to the third party health service provider.

FIG. 6b illustrates the actions taken by the processor 30. The user input 34, being a biometric measurement of the user's fingerprint is received by the processor 30, from the user input device 32. The PUF 36 is also received from a query applied to the device 10. Within the system is present a query component which makes a PUF query to the device 10. This component (not shown) could be built in within the device 10. The user input 34 is combined with user helper data 38 to generate a first key 40, and the PUF 36 is combined with device helper data 42 to generate a second key.

In this Figure, the key generation processes are shown as independent, but they could be configured in such a way that the key from one side is used to generate the helper data on the other side, and vice versa, as an extra security feature, using an additional stored component. The generation of the two keys 40 and 44 could occur simultaneously, or in the case where the key of one is used to generate the helper data of the other, then the generation would occur sequentially. Either key could be generated first. The reference to the user's key as the first key 40 does not mean that it is the first key to be generated by the processor 30.

After the keys 40 and 44 have been generated then they are passed to an operation stage 46, which performs an operation using the two keys 40 and 44. This operation could take a number of different forms. In the simplest embodiment, the operation is the transmission of the two keys 40 and 44, with the acquired data about the user's blood pressure, to the third party service provider. Another option would be to combine the two keys 40 and 44 into a third key and transmit this third key with the data. A third option would be to encrypt the user's health data with either the two keys 40 and 44, or using something (such as a hash function output) derived from the two keys 40 and 44. Another option would be the generation of a digital signature using the keys 40 and 44 to sign the data before it is sent. In this way the data gathered by the user is authenticated using the two keys 40 and 44.

Figure 7:
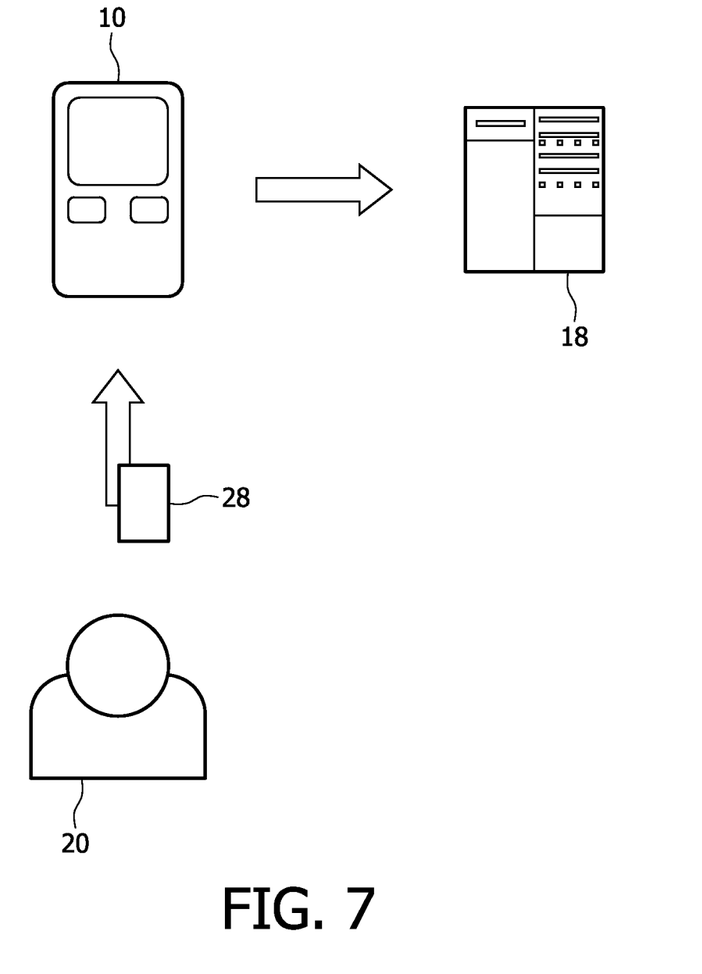
FIG. 7 is a schematic diagram of a further embodiment of the system.

The key Kuj derived from the user, which in the preferred embodiment is a biometric measurement, could be derived from a password for example. The intent is to make the key that is used to sign dependent on something that User Uj has to provide or enter into the system. It does not necessarily have to be a biometric, although this would make it less likely to be vulnerable to impersonation attacks. This embodiment is shown in FIG. 7. In this embodiment, the user 20 provides a user input which is a password 28.

The device 10 generates a key from the password, and also performs a physical measurement of the device (using a PUF). The device accesses the helper data for the device and computes a second key from the physical measurement and the helper data, as discussed in detail above. The device then transmits the first and second keys (or a third key derived from these two keys) to the health service provider 18.

The system can also be adapted to generating a single per user key from multiple devices. In this embodiment, there is provided an approach that uses only one key per patient/user regardless of the number of devices that are used for obtaining data (in contrast to previous embodiments where one key per each user-device combination was necessary). For this construction it is possible to use threshold secret sharing, which is described in the following.

Threshold secret-sharing is described in Alfred J. Menezes, Paul C. van Oorschot and Scott A. Vanstone, "Handbook of Applied Cryptography", CRC Press, 1997. A (t,n) threshold scheme (t<=n) is a method by which a trusted party computes secret shares $S_i$, $1<=i<=n$ from an initial secret S, and securely distributes $S_i$ to user $P_i$, such that the following is true: any t or more users who pool their shares may easily recover S, but any group knowing only t−1 or fewer shares may not. A perfect threshold scheme is a threshold scheme in which knowing only t−1 or fewer shares provide no advantage (no information about S whatsoever, in the information-theoretic sense) to an opponent over knowing no shares.

Shamir's threshold scheme is based on polynomial interpolation, and the fact that a univariate polynomial y=f(x) of degree t−1 is uniquely defined by t points $(x_i; y_i)$ with distinct $x_i$ (since these define t linearly independent equations in t unknowns). The coefficients of an unknown polynomial f(x) of degree less than t, defined by points $(x_i; y_i)$, $1<=i<=t$, are given by the Lagrange interpolation formula:

$$f(x) = \sum_{i=1}^{t} y_i \prod_{1 \le j \le t, j \ne i} \frac{x - x_j}{x_i - x_j}.$$

Since f(0)=a0=S, the shared secret may be expressed as:

$$S = \sum_{i=1}^{t} c_i y_i,$$

where $$c_i = \prod_{1 \le j \le t, j \ne i} \frac{x_j}{x_j - x_i}.$$

Thus each group member may compute S as a linear combination of t shares $y_i$, since the $c_i$ are non-secret constants (which for a fixed group of t users may be precomputed).

Below is shown Shamir's (t,n) threshold scheme. Shamir's threshold scheme is provided as an example, however, other threshold secret sharing schemes can also be used, for example, Oded Goldreich, Dana Ron, Madhu Sudan: "Chinese remaindering with errors" IEEE Transactions on Information Theory 46(4): 1330-1338 (2000).

---

Mechanism Shamir's (t, n) threshold scheme

SUMMARY: a trusted party distributes shares of a secret S to n users.
RESULT: any group of t users which pool their shares can recover S.
1. Setup. The trusted party T begins with a secret integer $S \geq 0$ it wishes to distribute among n users.
   (a) T chooses a prime $p > \max(S, n)$, and defines $a_0 = S$.
   (b) T selects $t-1$ random, independent coefficients $a_1, \ldots, a_{t-1}, 0 \leq a_j \leq p-1$, defining the random polynomial over $\mathbb{Z}_p$, $f(x) = \sum_{j=0}^{t-1} a_j x^j$.
   (c) T computes $S_i = f(i) \bmod p$, $1 \leq i \leq n$ (or for any n distinct points i, $1 \leq i \leq p-1$), and securely transfers the share $S_i$ to user $P_i$, along with public index i.
2. Pooling of shares. Any group of t or more users pool their shares (see Remark 12.70). Their shares provide t distinct points $(x,y) = (i, S_i)$ allowing computation of the coefficients $a_j, 1 \leq j \leq t-1$ of $f(x)$ by Lagrange interpolation (see below). The secret is recovered by noting $f(0) = a_0 = S$.

---

Using Shamir's Threshold scheme it is possible to combine several keys (in this particular case two keys) to generate a single key as follows. This uses a 2-out-n threshold scheme as follows. The user computes a different key Ki for every device as has been described in the previous embodiments. The user also computes a key based on his biometric Kuj. The user defines a 2-out-n threshold scheme as follows:

The user chooses a prime p large enough such that Ki<p and Kuj<p. Alternatively, it is possible to choose a prime p large enough for security purposes, and based on this, compute strings Ki' and Kuj', which (when interpreted as integers) are less than p. One possible way to compute such strings is simply as Ki'=Hash(Ki) mod p and Kuj'=Hash(Kuj) mod p, for some hash function Hash. The user chooses a random key Kij such that 2<=Kij<=p-1, and sets a0=Kij. The user then chooses one independent and random coefficient a1 such that 1<=a1<=p-1. Note that a1 must be non-zero (in contrast to the general Shamir's threshold scheme). The user computes a share Yuj as follows: Yuj=a1*Kuj'+a0. The user stores in device i Yuj (Yuj is the same for all devices). The user then computes a share Yi for device i as follows: Yi=a1*Ki'+a0. The user stores in device i Yi. The Yi is device dependent. This is repeated for every device i that the user wants to use.

If the system supports only symmetric-key authentication then the key Kij (corresponding to a0) is sent to the service provider. If the system is public-key based then a corresponding public key is derived using a0 as the secret key of the system and the public-key is sent to the service provider via a secure and authenticated channel. To provide the authentication in such a system, the user obtains their biometric dependent key and obtains a user share (Kuj', Yuj). The device computes its key Ki (by any of the methods described above which might include the use of the user's biometric as well) and obtains a device share (Ki, Yi) for device i. Using Lagrange interpolation the key Kij is reconstructed from the two shares. The user uses Kij to compute a MAC or a signature on the data being sent to the service provider.

There are several advantages of the proposed system. Most importantly, the system allows for early coupling of device and user identifiers that can be obtained by strong authentication (for example using PUFs and biometrics). In the preferred embodiment, the key derivation is performed in one step which leads to higher reliability.

Furthermore, the system is advantageous because there it is necessary to register with the service provider only a single key per user. This supports separation of duties. The service provider or health service infrastructure does not have to take care of registration of measurement devices. A TTP (Trusted Third Party), such as a Continua certification centre, can perform the registration in a way that for each device a user has, the combined device/user key is the same, as described in the final embodiment. The TTP certifies the key which is registered by service providers and health service infrastructure. This is much simpler than continuously registering with the service provider the keys of each device the user has and will obtain (which is required by traditional approaches). Additionally, at the service provider and health service infrastructure site, the key management is much simpler as they have to deal with far fewer keys. They do not have to change much current practice of using one identifier/key per patient. Finally, depending on the embodiment chosen for the implementation, it is possible to identify a user which has not been registered before, which also contributes to the reliability of the measured data.

Next to that, there are important advantages of biometrics over other authentication approaches. Most importantly, some physiological measurements could serve a dual purpose. For example, measuring patient's vital signs (for example ECG) and at the same time using the measurement for patient authentication (biometric data can be extracted from the physiological measurement such as ECG). This methodology couples the measurement to the patient as strongly as possible. In addition, biometric data is more convenient and secure than a passwords or smartcards that can be forgotten or lost. Biometric data provides a stronger type of authentication when compared to smartcards or passwords, which can be easily handed over to other people.

The invention claimed is:
1. A method of authenticating a device and a user comprising:
   receiving a user input,
   generating a first key from the user input,
   performing a physical measurement of the device, wherein the physical measurement comprises at least performing a Physical Uncloneable Function (PUF) on the device,
   obtaining helper data for the device, wherein the helper data comprises data associated with the physical measurement,
   computing the second key from the physical measurement and the helper data, and
   performing an operation using the first key and the second key, wherein the operation authenticates the device and the user, wherein performing the operation using the first and second keys comprises performing a defined function on the first and second keys and acquired health data of the user, wherein the acquired health data comprises health data acquired by the device.

2. A method according to claim 1, wherein the performing the defined function on the first and second keys and health data creates a third key.

3. A method according to claim 1, wherein the step of receiving a user input comprises receiving a password and the step of generating a first key from the user input comprises computing the first key from the password.

4. A method according to claim 1, wherein the step of receiving a user input comprises performing a biometric measurement of the user and the step of generating a first key from the user input comprises obtaining helper data for the user and computing the first key from the biometric measurement and the user helper data.

5. A method according to claim 4, wherein the step of obtaining helper data for the device comprises computing the helper data from the first key and a stored component.

6. A method according to claim 1, and further comprising obtaining a user share, obtaining a device share, and performing a defined function on the user share, device share, first and second keys to obtain a third key.

7. A system for authenticating a device and a user comprising:
a user interface arranged to receive a user input,
a query component arranged to perform a physical measurement of the device, wherein the physical measurement comprises at least performing a Physical Uncloneable Function (PUF) on the device, and
a processing component connected to the user interface and the query component, and arranged to:
generate a first key from the user input,
obtain helper data for the device,
wherein the helper data comprises data associated with the physical measurement,
compute the second key from the physical measurement and the helper data, and
perform an operation using the first key and the second key,
wherein the operation authenticates the device and the user, wherein performing the operation using the first and second keys comprises performing a defined function on the first and second keys and acquired health data of the user, wherein the acquired health data comprises health data acquired by the device.

8. A system according to claim 7, wherein the processing component is arranged, when the defined function on the first and second keys and health data creates a third key.

9. A system according to claim 7, wherein the user input comprises a password and the processing component is arranged, when generating a first key from the user input, to compute the first key from the password.

10. A system according to claim 7, wherein the user input comprises a biometric measurement of the user and the processing component is arranged, when generating a first key from the user input, to obtain helper data for the user and to compute the first key from the biometric measurement and the user helper data.

11. A system according to claim 10, wherein the processing component is arranged, when obtaining helper data for the device, to compute the helper data from the first key and a stored component.

12. A system according to claim 7, wherein the processing component is further arranged to obtain a user share, obtain a device share, and to perform a defined function on the user share, device share, first and second keys to obtain a third key.

13. A system according to claim 7, wherein the user interface, the query component and the processing component are contained within a single device.

14. A system according to claim 7, wherein the user interface, the query component and the processing component are distributed across a plurality of devices.

15. A method of registering a device and a user comprising:
receiving a user input,
generating a first key from the user input,
performing a physical measurement of the device, wherein the physical measurement comprises at least performing a Physical Uncloneable Function (PUF) on the device,
generating a second key and helper data for the device from the physical measurement, wherein the helper data comprises data associated with the physical measurement,
performing an operation using the first key and the second key, and transmitting an output of the operation to a remote data store, wherein the operation authenticates the device and the user, wherein performing the operation using the first and second keys comprises performing a defined function on the first and second keys and acquired health data of the user, wherein the acquired health data comprises health data acquired by the device.

16. A method according to claim 15, wherein the step of receiving a user input comprises performing a biometric measurement of the user and the step of generating a first key from the user input generating helper data for the user.

17. A system for registering a device and a user comprising:
a user interface arranged to receive a user input,
a query component arranged to perform a physical measurement of the device, wherein the physical measurement comprises at least performing a Physical Uncloneable Function (PUF) on the device, and
a processing component arranged to generate a first key from the user input, to generate a second key and helper data for the device from the physical measurement,
wherein the helper data comprises data associated with the physical measurement,
to perform an operation using the first key and the second key, and transmitting an output of the operation to a remote data store,
wherein the operation authenticates the device and the user, wherein performing the operation using the first and second keys comprises performing a defined function on the first and second keys and acquired health data of the user, wherein the acquired health data comprises health data acquired by the device.

18. A system according to claim 17, wherein the user input comprises a biometric measurement of the user and the processing component is further arranged, when generating a first key from the user input, to generate helper data for the user.

* * * * *